(12) United States Patent
Motson

(10) Patent No.: US 6,612,432 B2
(45) Date of Patent: Sep. 2, 2003

(54) UNIVERSAL CASE FOR PORTABLE ELECTRONIC DEVICE

(76) Inventor: W. David Motson, 417 Columbia Blvd., Cherry Hill, NJ (US) 08002

( * ) Notice: Subject to any disclaimer, the term of this patent is extended or adjusted under 35 U.S.C. 154(b) by 106 days.

(21) Appl. No.: 09/977,164

(22) Filed: Oct. 15, 2001

(65) Prior Publication Data

US 2003/0070947 A1 Apr. 17, 2003

(51) Int. Cl.$^7$ .............................. B65D 85/00; A45C 1/04
(52) U.S. Cl. ..................... 206/305; 206/320; 224/667; 383/86
(58) Field of Search ................................ 206/305, 320, 206/576; 383/81, 86, 86.1, 86.2; 224/667–674

(56) References Cited

U.S. PATENT DOCUMENTS

| | | | | |
|---|---|---|---|---|
| 1,747,801 A | * | 2/1930 | Topal | 383/81 |
| 2,295,143 A | * | 9/1942 | Watkins | 224/674 |
| 4,420,078 A | * | 12/1983 | Belt et al. | 206/305 |
| 4,573,573 A | * | 3/1986 | Favaro | 206/305 |
| D316,999 S | | 5/1991 | Sarff | |
| 5,025,921 A | * | 6/1991 | Gasparaitis et al. | 206/320 |
| 5,100,037 A | * | 3/1992 | Kopyta et al. | 224/673 |
| D329,542 S | | 9/1992 | Jayez | |
| D343,291 S | | 1/1994 | Langford | |
| 5,348,347 A | * | 9/1994 | Shink | 206/576 |
| 5,511,704 A | | 4/1996 | Linderer | |
| 5,718,104 A | * | 2/1998 | Kennedy | 206/320 |
| 5,850,754 A | * | 12/1998 | Dobbins | 206/305 |
| 5,857,600 A | * | 1/1999 | Akutsu | 224/674 |
| 6,076,789 A | | 6/2000 | Jackson | |
| 2002/0175099 A1 | * | 11/2002 | Wu | 206/320 |

* cited by examiner

*Primary Examiner*—Jim Foster
(74) *Attorney, Agent, or Firm*—Norman E. Lehrer

(57) ABSTRACT

A case for holding a portable electronic device is disclosed which includes a body portion having a front panel, a rear panel, and two side panels. The body portion has a cavity formed by the front, rear, and side panels. The cavity has an open top end and an open bottom end. A top flap is releasably secured to the body portion within the cavity. A bottom flap is attached to and extends downwardly from the body portion. To cover the open bottom end of the cavity, the bottom flap is folded over the open end and releasably secured to the rear panel. When it is desired to cover the top open end of the cavity, the top flap is folded over the cavity and secured to the front panel of the body portion. The top flap may be adjusted so as to accommodate various types of portable devices.

5 Claims, 3 Drawing Sheets

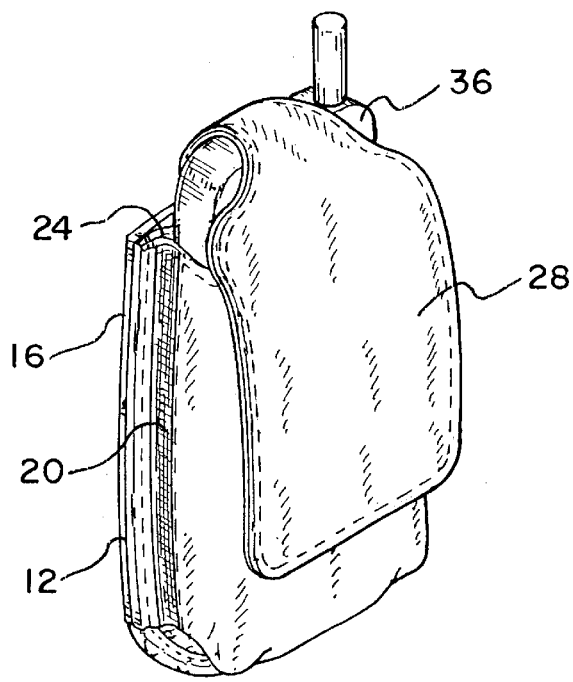
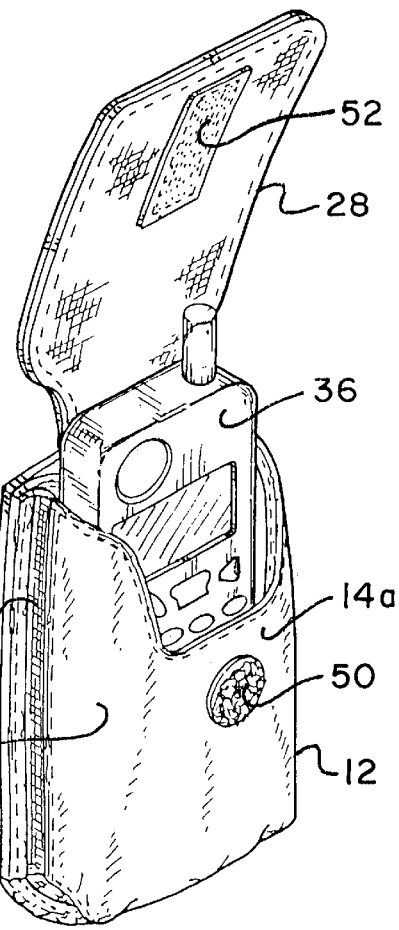
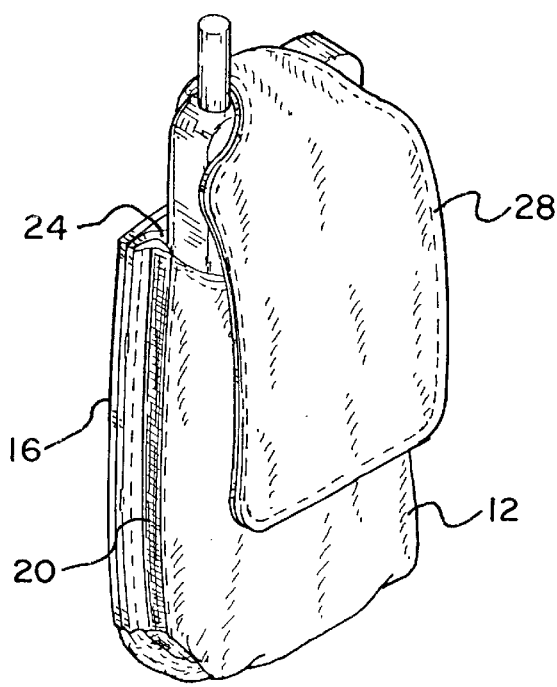

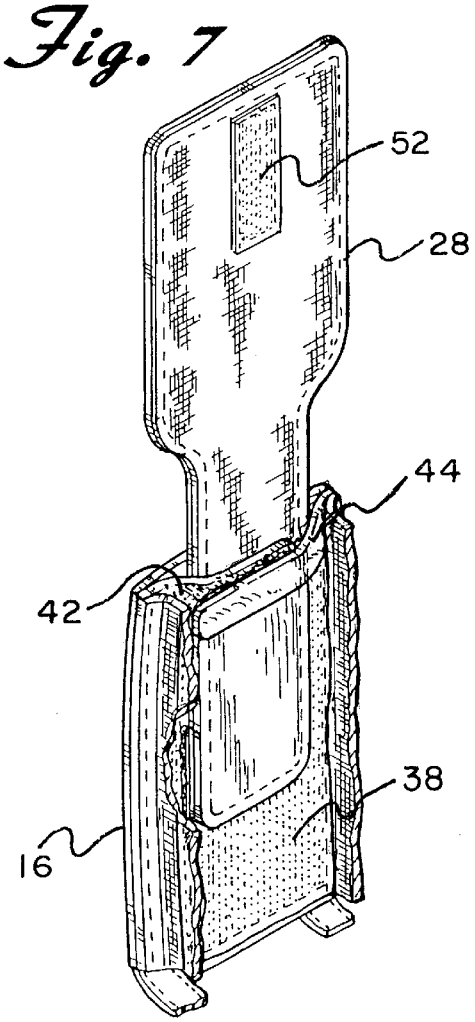
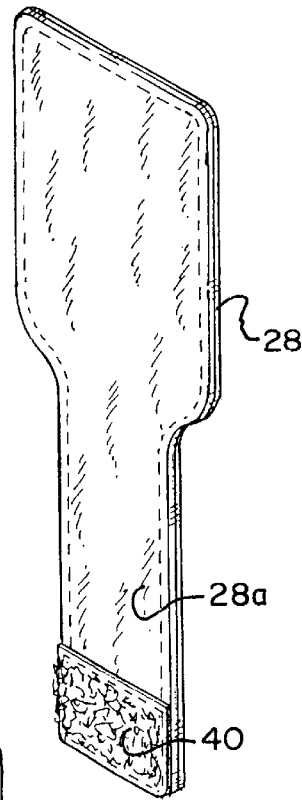
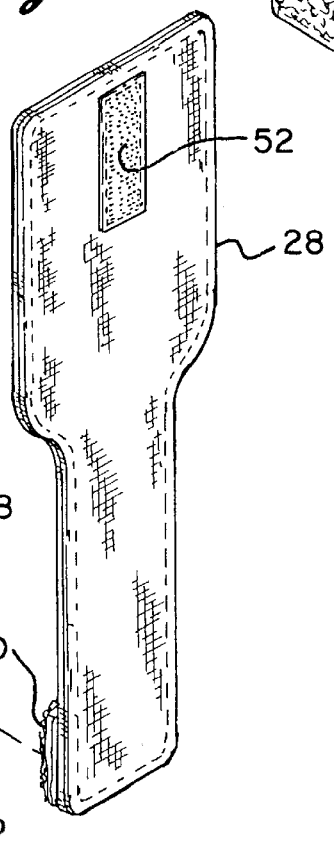
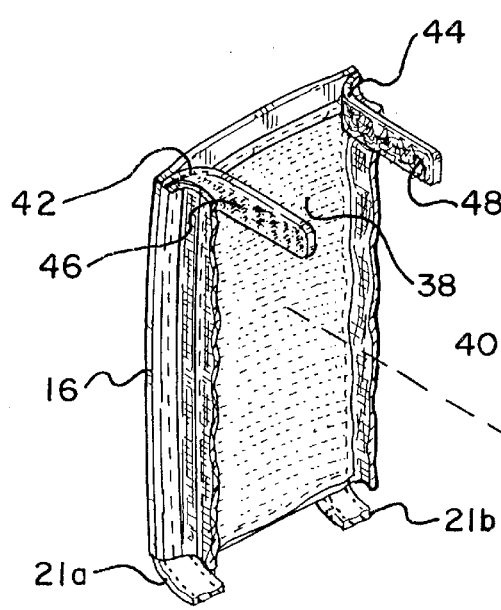

US 6,612,432 B2

UNIVERSAL CASE FOR PORTABLE ELECTRONIC DEVICE

BACKGROUND OF THE INVENTION

The present invention is directed toward a case for carrying a portable electronic device and more particularly, toward a case which is adjustable so as fit virtually any type of portable electronic device.

The use of portable electronic devices such as palm pilots, personal digital assistants, and in particular, cellular telephones has become quite widespread today. This is in part due to the convenience of carrying such devices. For example, the size of most cellular phones makes them easy to transport and allows a person to communicate from virtually anywhere. A problem occurs, however, with how to transport or carry the phone. That is, it is burdensome to have to hold the phone in one's hands. A further problem occurs when the user of the phone holds it in that the phone is frequently misplaced or forgotten. Furthermore, they often take up too much room in or are difficult to retrieve from a purse, glove box, or briefcase.

Holders have been developed which allow a person to carry a phone with him or her without having to actually hold the phone in his or her hand while the phone is not in use. For example, the phone may be carried by users on their person. Yet, while some phones are quite small, they are not comfortably carried within a pocket. To solve this problem, holsters have been developed which allow the phone to be attached to a person's belt or personal belongings, such as a purse or briefcase. Many of these holsters, however, are not easily removable from the belt, purse, or briefcase.

Another drawback of the many of the above-mentioned holders is that the holders cannot be adjusted to accommodate a wide variety of cellular phones, as the phones can vary greatly in size. Even the size of the antenna or where the antenna is located on the phone may vary greatly from phone to phone. Therefore, a need exists for a cellular phone case or holder which accommodates a wide variety of cellular phones.

SUMMARY OF THE INVENTION

The present invention is designed to overcome the deficiencies of the prior art discussed above. It is an object of the present invention to provide a case for a portable electronic device which will fit virtually any type of portable device.

It is a further object of the present invention to provide a case for a cellular phone which allows the phone to be recharged without having to take the phone out of its case.

In accordance with the illustrative embodiments demonstrating features and advantages of the present invention, there is provided a case for a portable electronic device which includes a body portion having a front panel, a rear panel, two side panels, and two bottom straps. The body portion has a cavity formed by the interior surfaces of the front, rear, and side panels. The cavity has a generally open top end and a generally open bottom end. A top flap is releasably secured to the body portion within the cavity and generally covers the open top end of the cavity. A bottom flap is attached to and extends downwardly from the body portion. In order to cover the open bottom end of the cavity, the bottom flap is folded over the open end and releasably secured to the rear panel of the body portion. The top flap is releasably attached to the body portion within the cavity via hook and loop type fasteners. The top flap extends upwardly from the body portion. When it is desired to cover the top open end of the cavity, the top flap is folded over the cavity and secured to the front panel of the body portion. The top flap may be adjusted so as to accommodate various types of portable devices. Means for securing the top flap within the cavity are attached to the interior surface of the rear panel. The top end of the cavity may be partially open when the top flap is secured to the front panel in order to accommodate the antenna of various types of electronic devices, such as a cellular phone. Also, the exterior surface of the rear panel has means for securing the case to a person's clothing, personal belongings, or the like.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a front perspective view of the case of the present invention with one type of cellular phone supported therein;

FIG. 2 is a front perspective view of the case of the present invention with another type of phone supported therein;

FIG. 3 is a front perspective view of the case of the present invention with the top flap in an open position and a phone supported therein;

FIG. 7 is front perspective view of the case of the present invention with the front portion of the case cut away and the top flap in an upwardly extending position;

FIG. 8 is a exploded view of the case of the present invention illustrating the attachment of the top flap to an inside surface of the case; and FIG. 9 is a rear perspective view of the top flap of the present invention.

DETAILED DESCRIPTION OF THE PREFERRED EMBODIMENT

Figure 6:
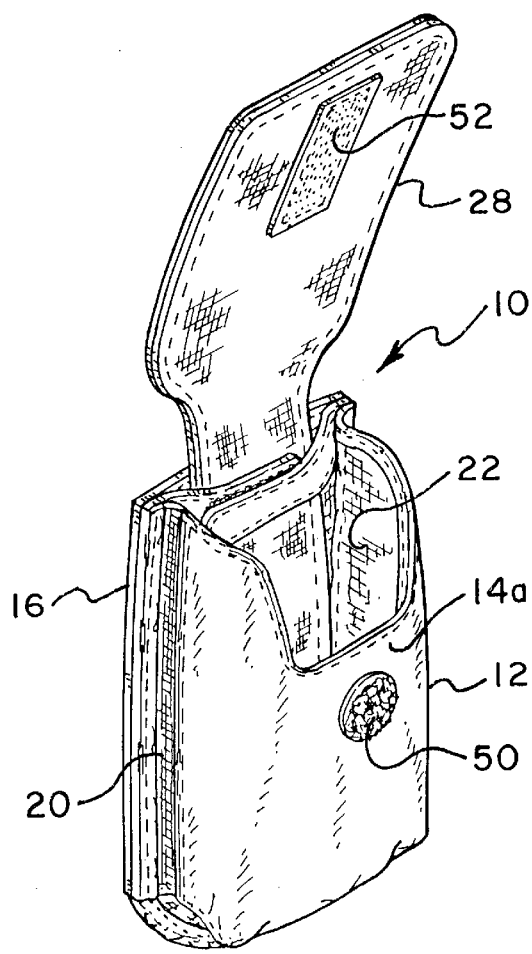
FIG. 6 is front perspective view of the case of the present invention with the top flap in an open position.

Referring now to the drawings in detail wherein like reference numerals have been used throughout the various figures to designate like elements, there is shown in FIG. 6 a case constructed in accordance with the principles of the present invention and designated generally as 10.

Figure 5:
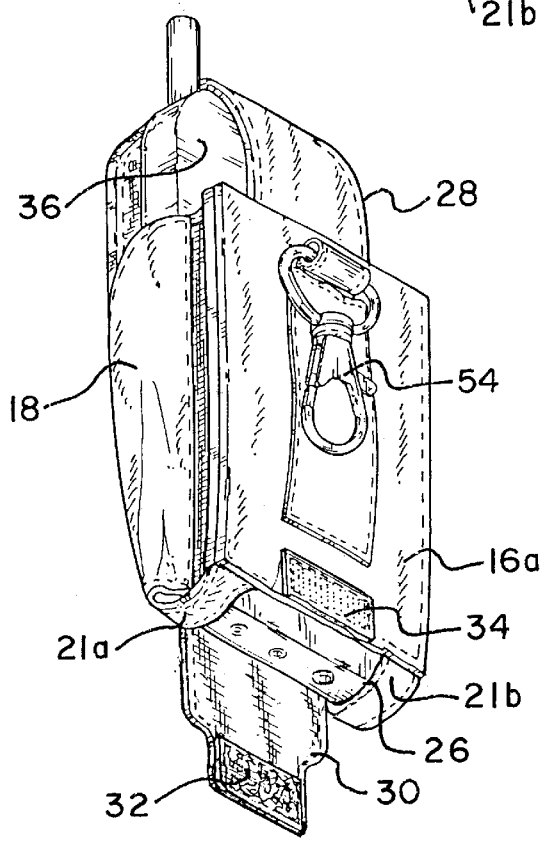
FIG. 5 is a rear perspective view of the case of the present invention with the bottom of the case being opened.

The case 10 of the present invention essentially includes a body portion 12 having a front panel 14, a rear panel 16, two side panels 18 and 20, and two bottom straps 21a and 21b. The body portion 12 has a cavity 22 formed by the interior surfaces of the front panel 14, rear panel 16, and side panels 18 and 20. (See FIG. 6.) The cavity 22 has a generally open top end 24 and a generally open bottom end 26. (See FIGS. 5 and 6.) A top flap 28 is releasably secured to the body portion 12 within the cavity 22 and generally covers the open top end 24 of the cavity 22. (See FIGS. 2 and 6.)

A bottom flap 30 is attached to and extends downwardly from the body portion 12. (See FIG. 5.) The case may be made from leather or artificial leather-like material.

Figure 4:
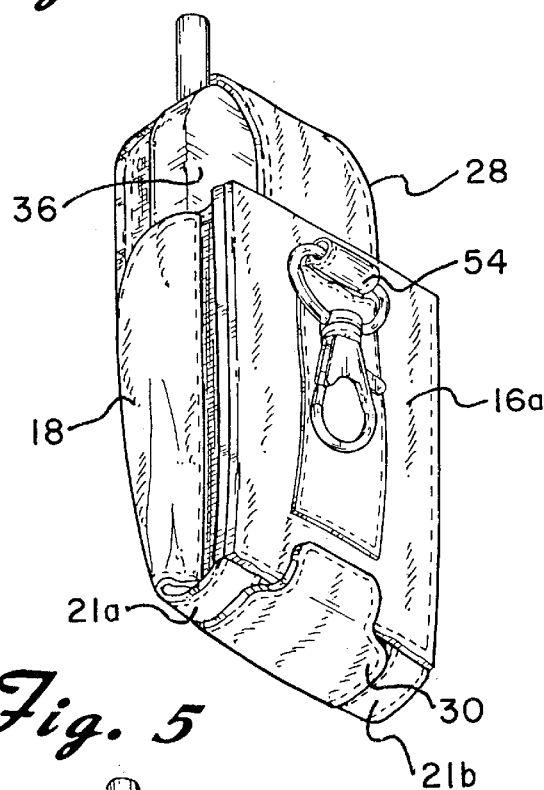
FIG. 4 is a rear perspective view of the case of the present invention with the bottom of the case in a closed position.

In order to cover the open bottom end 26 of the cavity 22, the bottom flap 30 is folded over the open end 26 and releasably secured to the rear panel 16 of the body portion 12. (See FIG. 4.) The securing means may be a hook and loop type fastener such as VELCRO with a section 32 of the VELCRO attached to the bottom flap 30 and a corresponding section 34 of VELCRO attached to the exterior surface 16a of the rear panel 16 of the body portion 12. (See FIG. 5.) The open bottom end 26 of the cavity 22 allows for the phone's battery to be recharged without having to take the phone 36 out of the case.

The top flap 28 is releasably attached to the body portion 12 within the cavity 22 via hook and loop type fasteners, such as VELCRO. For example, the interior surface of the rear panel 16 may have a VELCRO section 38 secured thereto with a corresponding section 40 of VELCRO secured to the rear surface 28a of the top flap 28. The top flap 28 extends upwardly from the body portion 12. (See FIG. 7.) The top flap 28 is held in place by a strap with two arms 42 and 44. Each of the arms 42 and 44 has securing means which may be strips 46 and 48 of Velcro. (See FIG. 8.) The arms 42 and 44 can be secured together, thereby holding the top flap 28 in place. (See FIG. 7.) When it is desired to cover the open top end 24 of the cavity 22, the top flap 28 is folded over the cavity 22 and secured to the exterior surface 14a of the front panel 14 of the body portion 12. Again, the securing means may be a hook and loop type fastener, shown for example as strips 50 and 52.

The top flap 28 may be adjusted so as to accommodate various types of cellular phones. That is, by releasing the flap 28 from the interior surface of the rear panel 16, the height of the top flap 28 may be adjusted so as to accommodate the height of the cellular phone. (See FIG. 8.) The top end 24 of the cavity 22 may be partially open in order to accommodate the antenna of various types of cellular phones. That is, right and left side openings may be formed when the top end 24 of the cavity 22 is partially closed by the top flap 28. (See FIGS. 1 and 2.) Also, the exterior surface 16a of the rear panel 16 has means for securing the case to a person's clothing or belt, personal belongings, such as a purse or briefcase, or the like. For example, the securing means may be a spring biased clip 54. (See FIG. 5.)

While the present invention has been mainly described as a case for carrying a cellular phone, it should be realized that this is by way of example only and that other portable electronic devices may be carried by the present invention. For example, the case of the present invention may be used to hold a palm pilot, a personal digital assistant, a radio, or the like.

The present invention may be embodied in other specific forms without departing from the spirit or essential attributes thereof and accordingly, reference should be made to the appended claims rather than to the foregoing specification as indicating the scope of the invention.

I claim:

1. A universal case for holding a portable electronic device comprising:

a body portion having a front panel, a rear panel and two side panels;

a cavity formed by said front, rear, and side panels and having a generally open top end and a generally open bottom end;

a top flap being releasably secured to said body portion and adjustable thereon, said top flap being adapted to generally cover said open top and; and a bottom flap being releasably secured to said body portion, said bottom flap being adapted to generally cover said open bottom end.

2. The universal case for holding a portable electronic device of claim 1 wherein said top and bottom flaps are releasably secured to said body portion by hook and loop fasteners.

3. The universal case for holding a portable electronic device of claim 1 wherein at least one opening is formed at said top end of said cavity when said top flap covers said open top end.

4. The universal case for holding a portable electronic device of claim 3 wherein said at least one opening is adapted to allow an antenna of a portable electronic device to extend therethrough.

5. The universal case for holding a portable electronic device of claim 3 wherein said at least one opening is adapted to allow an antenna of a cellular phone to extend therethrough.

* * * * *